United States Patent

Ward

[11] Patent Number: 5,314,585
[45] Date of Patent: May 24, 1994

[54] LOW SHEAR UHLE BOX

[75] Inventor: Kevin C. Ward, Carthage, N.Y.

[73] Assignee: Champion International Corporation, Stamford, Conn.

[21] Appl. No.: 58,309

[22] Filed: May 10, 1993

[51] Int. Cl.$^5$ .............................................. D21F 1/48
[52] U.S. Cl. ...................................... 162/274; 162/374
[58] Field of Search ............... 162/272, 274, 279, 352, 162/374, 363

[56] References Cited

U.S. PATENT DOCUMENTS

| 2,043,415 | 6/1936 | Lapeyrouse | 162/279 |
| 2,245,109 | 6/1941 | Lapeyrouse | 162/274 |
| 3,066,068 | 11/1962 | Calehuff | 162/374 |
| 3,278,368 | 10/1966 | Wicker | 162/279 |
| 3,313,679 | 4/1967 | Hintermaier et al. | 162/358.1 |
| 3,347,740 | 10/1967 | Goumeniouk | 162/274 |
| 3,420,736 | 1/1969 | Kwasniewski et al. | 162/374 |
| 3,537,955 | 11/1970 | Huerta et al. | 162/363 |
| 3,871,953 | 3/1975 | Lee et al. | 162/274 |
| 4,067,770 | 1/1978 | Blott et al. | 162/274 |

FOREIGN PATENT DOCUMENTS

| 1092869 | 1/1981 | Canada | 162/374 |
| 2922623 | 12/1979 | Fed. Rep. of Germany | 162/306 |
| 810707 | 3/1959 | United Kingdom | 162/306 |

Primary Examiner—Karen M. Hastings

[57] ABSTRACT

An improved Uhle box for use in a paper press includes an elongated, generally U-shaped support structure closed at its opposite ends by deckle pieces, and with each upstanding leg including a cylindrical recess for rotatably mounting a cylinder on which the wet felt is supported. The central portion of the support structure defines a vacuum zone which is in communication with a vacuum source. Lubrication is provided to the rotatable cylinder as the wet felt is passed over the Uhle box, and moisture is extracted from the wet felt as it passes over the vacuum zone.

6 Claims, 1 Drawing Sheet

LOW SHEAR UHLE BOX

BACKGROUND OF THE INVENTION

In a typical paper making process, water is extracted from the paper web in a number of different operations. For example, in the forming section of the Fourdrinier, the fiber and water slurry is conveyed on a bronze or synthetic wire across a series of spaced transversely extending foil blades. Each foil blade is provided with a generally sharp edge facing in an upstream direction. As the paper web passes across the foil blade, a vacuum is created between the paper web and the upper surface of the foil blade, and draws water from the paper web. The edge of the next succeeding blade riding against the lower surface of the bronze or synthetic wire functions to remove more moisture.

The paper press felt is used in the press section of a paper machine to support the paper web as the web is passed through a pair of cooperating press rollers to extract water from the web. Following the pressing of the paper web, it is separated from the felt and passed to further processing stations.

While the felt is extracting water from the paper web in the press section, water migrates from the paper web into the felt. The paper stock slurry being treated typically consists of a mixture of wood pulp, pitch, water and numerous chemicals. Some components contained in the paper stock slurry can be detrimental to the efficient operation of the paper press. For example, some components can become attached to and imbedded in the felt and can inhibit the free movement of water from the paper web to the felt.

The felt normally comprises an endless fabric so that after it is separated from the paper web following pressing, the felt is then caused to transverse several return rolls. Thereafter, it is directed back to the point where the wet paper web coming from the wire is received onto the felt. In order to assure uniform porosity of the felt and proper and efficient operation of the press section, the moisture must be uniformly extracted from the felt before the wet paper web is received back onto the felt. It is desirable for the felt be cleaned on its return run after the paper web is separated from the felt. Such cleansing is commonly accomplished by conventional Uhle boxes over which the felt is caused to travel on its return run. During the endless travel of the felt in the press section of the paper machine, the web-supporting surface of the felt is commonly passed in direct contact with one or more Uhle boxes.

The typical suction or Uhle box includes a rigid cover which supports the felt that carries the paper web, and the cover is provided with a plurality of perforations or slots. The cover portion is attached to a vacuum source which functions to remove moisture from the felt by creating a vacuum through the vacuum slots provided in the interior portion of the Uhle box.

Of particular importance in the case of most paper presses is that a build up of pitch typically occurs on the Uhle box strips. Pitch deposition can be detrimental to the efficient operation of the press section. Pitch can deposit on process equipment and press felt resulting in operational problems in such systems. Deposition of pitch can occur not only on metal surfaces in the system, but also on plastic and synthetic surfaces such as machining wires, felts, foil blades, as well as Uhle box strips. Pitch deposits may also break off the surfaces of Uhle box strips in the system and cause spots and defects in the final paper product which ultimately decreases the paper's quality. Machine breaks may also occur. Pitch deposition can also cause premature wear of the wet felts, thereby requiring the costly replacement of such felts.

Typically, the prior art Uhle box includes high density polyethylene or ceramic strips over which the paper press felt travels before entering the vacuum zone that extracts the moisture from the felt. A disadvantage of the use of polyethylene or ceramic strips in the conventional Uhle box is that a shearing force results between the traveling felt and the Uhle box strips. The shearing force arises due to the stress resulting from the applied force which causes the felt to slide relative to the Uhle box strips in a direction substantially parallel to their plane of contact. This resulting shearing force can cause a build-up of pitch which tends to deposit upon the Uhle box strips and the felt. These pitch deposits ultimately reduce the felt life, plug the felt, and accelerate wear of the strips of the Uhle box. To obviate this problem, it is necessary to periodically clean the Uhle box or the individual foil blades to remove pitch deposits which would otherwise build up and commonly obstruct the vacuum slots in the Uhle box or cause damage to the felt. The frequency of the periodic cleaning obviously causes downtime of the machinery and thus substantial production problems, and increased manufacturing costs.

Accordingly, it is an object of the subject invention to overcome the shortcomings of the prior art devices and to provide a new and improved Uhle box for a press section of a paper machine.

Another object of the subject invention is to provide a new and improved Uhle box which reduces pitch deposition in the press felt and on Uhle box strips.

Still a further object of the subject invention is to provide a new and improved Uhle box which provides for more efficient and better felt cleaning, and more efficient moisture removal.

It is another object of the subject invention to provide a new and improved Uhle box which enables a press section to operate more efficiently at lower cost.

A further object of the subject invention is to provide a new and improved Uhle box which results in less wear to the wet felt.

Still another object of the subject invention is to provide a new and improved Uhle box which eliminates the use of foil blades as part of the Uhle box.

SUMMARY OF THE INVENTION

The subject invention is directed to a new and improved suction or Uhle box for use in the press section of a paper machine. In accordance with the subject invention, the Uhle box includes an elongated, generally U-shaped structure which functions to support the wet felt while it passes over the Uhle box. The base of the U-shaped structure is generally rectangular and includes at least one opening therein in communication with a vacuum source. Extending upwardly from two opposed edges of the base are two parallel legs or walls, with the distal end of each leg defining an elongated cylindrical recess for rotatably receiving therein an elongated cylinder. End deckles interconnect the two upstanding walls, and cooperate with the walls and the base to define a vacuum zone below the wet felt as it transverses the space between the upstanding walls. The wet felt rides on the rotatable, elongated cylinders disposed in the cylindrical recesses of the upstanding walls.

In order to facilitate rotation of the elongated cylinders, each cylindrical recess of the supporting wall structure is provided with a plurality of perforations connected by suitable conduits to a source of lubrication. The lubrication may be water or cleaning chemical and is uniformly provided to the cylindrical recess in order to uniformly lubricate the outer surface of the respective elongated cylinder as it rotates in the cylindrical recess. Lubrication of the outer surface of each elongated cylinder aids in reducing the frictional forces or stresses between the wet felt and the rotating cylinders.

In operation, as the wet felt traverses the space between the rotating cylinders above the vacuum zone, moisture in the wet felt is extracted from the wet felt for subsequent disposal. Rotation of the elongated cylinders enables the wet felt to travel over the Uhle box with a minimum amount of frictional or shear forces, thereby greatly reducing the amount of pitch deposition on the Uhle box and the wet felt, as well as the amount of pitch deposition in the other components of the press section of the paper machine. The amount and type of lubrication to the rotating cylinders may be varied in order to decrease the amount of frictional forces between the wet felt and the rotating cylinders, and to further enhance the efficiency of the new and improved Uhle box of the subject invention.

DETAILED DESCRIPTION OF PREFERRED EMBODIMENT

Figure 1:
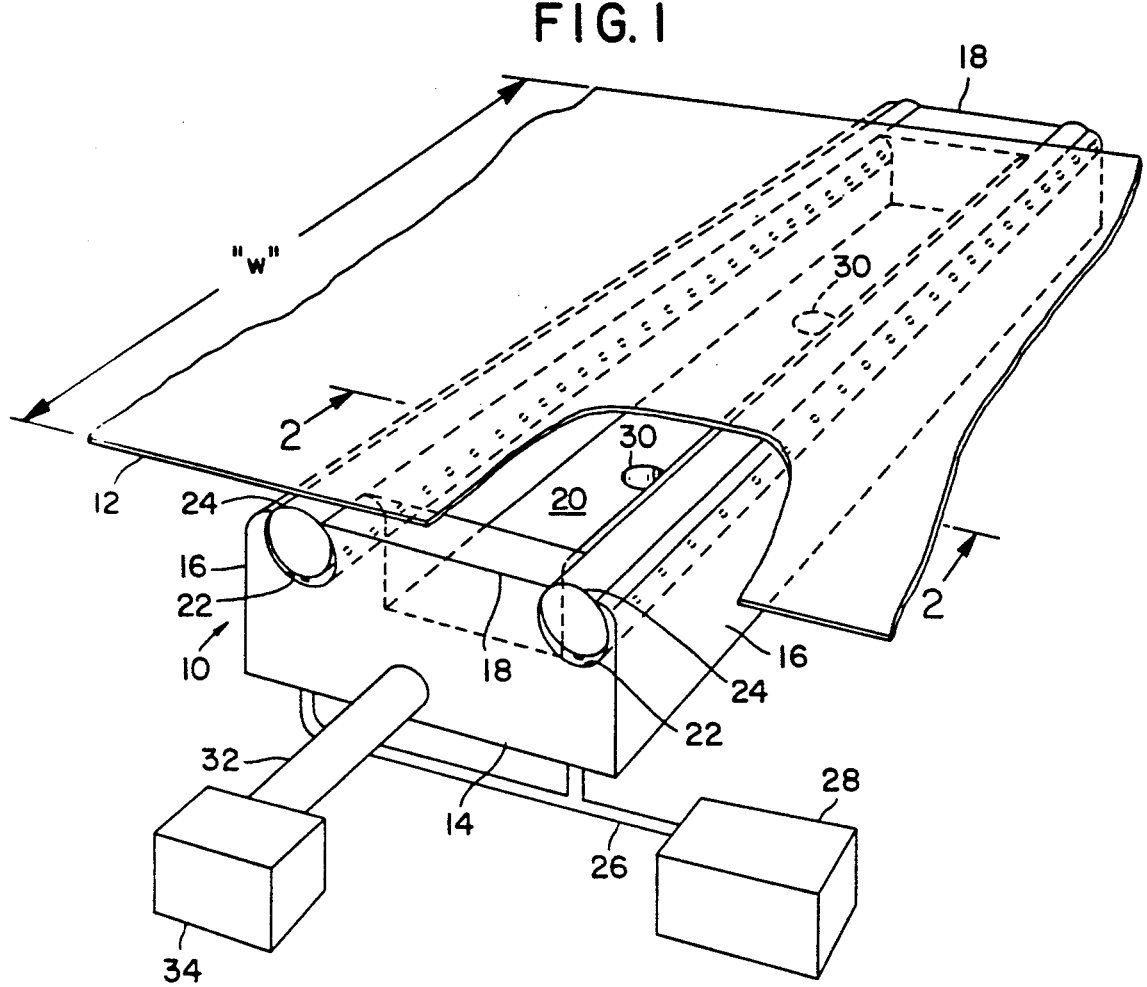
FIG. 1 is a perspective view, partially in section, of the Uhle box of the subject invention.
Figure 2:
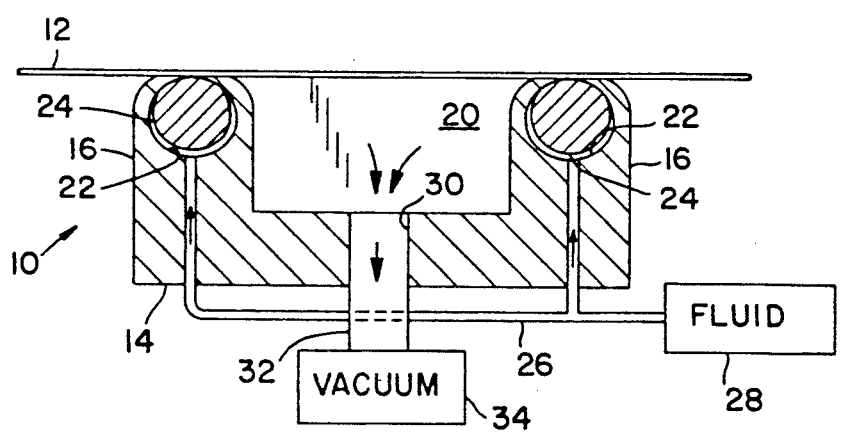
FIG. 2 is a cross-sectional view of the Uhle box of the subject invention taken along line 2—2 in FIG. 1.

Turning to FIG. 1, the felt suction box or Uhle box of the subject invention is generally designated by the numeral 10 and supports felt 12 and is effective for removing moisture therefrom. The Uhle box 10 is an elongated, hollow trough-like enclosure of generally U-shaped configuration including a base 14 and upstanding side walls 16, 16. Disposed at the opposite extremes of the Uhle box are deckle pieces 18, 18 which, together with Uhle box define an enclosed vacuum area, designated by the numeral 20 in FIGS. 1 and 2. Each upstanding side wall 16 includes at its upper end an elongated cylindrical recess 22 in which is rotatably mounted an elongated cylinder 24. The diameter of each elongated cylinder 24 is slightly less than the associated elongated cylindrical recess 22, thereby enabling the free rotation of the cylinder 24 within the recess. To facilitate rotation of the cylinders 24, each elongated cylindrical recess 22 is connected via a conduit distribution system 26 to a source of lubricant, designated by the numeral 28. Disposed along the length of the base portion 14 of the Uhle box 10 are a plurality of openings 30 which are in communication via conduit 32 with a vacuum source, designated 34.

As more clearly shown in FIG. 1, the width "w" of the felt 12 is sufficient to enclose the vacuum area 20, with the opposite edges of the felt 12 extending across the top portions of the deckle pieces 18, 18.

The elongated cylinders 24 may be constructed of teflon, ceramic or stainless steel, and, if desired, lubricant fluid provided from source 28 may be applied in a differential manner to the elongated cylindrical recesses 22, 22 in order to minimize the frictional forces that occur as the felt 30 travels over the rotating cylinders 24, 24. For example, it may be preferable to provide less lubrication to the upstream cylinder supporting the felt 12 before it passes over the vacuum zone 20, as compared to the amount of lubrication provided to the downstream cylinder since the felt 12 is more likely to contain a more considerable amount of moisture before it enters the vacuum zone 20 as opposed to when the felt reaches the downstream cylinder.

In operation, as the felt 12 carrying the paper web moves over the Uhle box 10, the felt uniformly bears against elongated cylinder 24, 24 thereby causing each cylinder to rotate in its respective elongated cylindrical recess 22. At such time, a source of pressurized lubricant, such as water, is uniformly provided via the distribution system 26 to the elongated cylindrical recesses 22, 22 thereby facilitating rotation of the elongated cylinders 24, 24. As the felt passes over the vacuum zone 20, moisture present in the felt is extracted by virtue of the differential pressure on opposite surfaces of the felt 12, and the extracted moisture is conducted through the duct 32 for disposal. As the felt 12 exits the Uhle box 10, the felt is uniformly and substantially devoid of any moisture and is in the proper condition to repeat its required usage in the paper press machine.

Rotation of the elongated cylinders functions to considerably reduce the amount of shear force applied to the felt as it moves across the Uhle box 10, both before and after it enters the vacuum zone 20. The subject Uhle box 12 also functions to reduce the amount of pitch deposition in the press felt, thereby aiding and prolonging the life of the felt 12.

Although the subject invention has been described by reference to a preferred embodiment, it will be apparent that many of the modifications can be devised by those skilled in the art that would fall within the spirit and scope of the invention as defined by the appended claims.

What is claimed is:

1. An Uhle box apparatus for extracting moisture from a wet felt in a paper making process comprising:
   an elongated wet felt support structure of generally U-shaped configuration including an elongated base and a pair of vertically extending, spaced support arms, the upper portion of each support arm defining an elongated cylindrical recess;
   a cylinder rotatably disposed in the elongated cylindrical recess of each support arm;
   deckle inserts disposed at the opposite ends of the U-shaped wet felt support structure to define therewith a vacuum zone intermediate the vertically extending support arms;
   vacuum means connected to said support structure and in communication with said vacuum zone; and
   lubrication means in communication with each cylindrical recess for facilitating rotation of said cylinder therein, said lubrication means includes a source of lubricating fluid and a distribution system interconnecting said source of lubricating fluid to each cylindrical recess for providing lubrication between the rotatable cylinder and the associated cylindrical recess, whereby as the wet felt passes over the vacuum zone of said apparatus and is supported by said rotating cylinders, moisture is extracted from the wet felt.

2. An Uhle box apparatus for extracting moisture from a wet felt in a paper making process as in claim 1, wherein said lubricating fluid is water.

3. An Uhle box apparatus for extracting moisture from a wet felt in a paper making process as in claim 1, wherein said lubricating means provides a differential amount of the lubricating fluid to each rotatable cylinder.

4. An Uhle box apparatus for extracting moisture from a wet felt in a paper making process as in claim 1, wherein each said respective cylinder is constructed of teflon, ceramic, or stainless steel.

5. An Uhle box apparatus for extracting moisture from a wet felt in a paper making process as in claim 1, wherein said vacuum means includes a source of vacuum interconnected through the base of said wet felt support structure and in communication with the vacuum zone.

6. An Uhle box apparatus for extracting moisture from a wet felt in a paper making process as in claim 5, wherein said base of the wet felt support structure includes a plurality of openings in communication with said source of vacuum.

* * * * *